US010933715B2

(12) United States Patent
Pihl et al.

(10) Patent No.: US 10,933,715 B2
(45) Date of Patent: Mar. 2, 2021

(54) METHOD FOR ESTIMATING A LIMIT VALUE

(71) Applicant: VOLVO TRUCK CORPORATION, Gothenburg (SE)

(72) Inventors: Anders Pihl, Torslanda (SE); Hans Westerlind, Nol (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 25 days.

(21) Appl. No.: 16/333,036

(22) PCT Filed: Oct. 24, 2016

(86) PCT No.: PCT/EP2016/075530
§ 371 (c)(1),
(2) Date: Mar. 13, 2019

(87) PCT Pub. No.: WO2018/077375
PCT Pub. Date: May 3, 2018

(65) Prior Publication Data
US 2019/0263222 A1 Aug. 29, 2019

(51) Int. Cl.
*B60H 1/00* (2006.01)
(52) U.S. Cl.
CPC ..... *B60H 1/00778* (2013.01); *B60H 1/00378* (2013.01); *B60H 1/00878* (2013.01);
(Continued)
(58) Field of Classification Search
CPC ............ B60H 1/00778; B60H 1/00378; B60H 1/00878; B60H 1/00964
See application file for complete search history.

(56) References Cited

U.S. PATENT DOCUMENTS 8,919,140 B2 * 12/2014 Johnson ................. B60H 1/323
62/133
9,128,510 B2 * 9/2015 Federico ................... G06F 7/00
(Continued)

FOREIGN PATENT DOCUMENTS

DE 102009053649 A1 6/2010
DE 102014203903 A1 9/2015
(Continued)

OTHER PUBLICATIONS

International Search Report dated Jul. 18, 2017 in International Application No. PCT/EP2016/075530.
(Continued)

*Primary Examiner* — Gordon A Jones
(74) *Attorney, Agent, or Firm* — Venable LLP; Jeffri A. Kaminski

(57) ABSTRACT

The invention relates to a method for estimating a limit value (TLV) for an interior temperature input of a passenger compartment (12) of a vehicle (10). The vehicle (10) comprises an energy storage source (30) and a temperature control arrangement (14) adapted to control the interior temperature of the passenger compartment (12) of the vehicle (10) on the basis of the interior temperature input. The temperature control arrangement (14) is adapted to be powered by the energy storage source (30) during at least one operating condition of the vehicle (10). The method comprises: —determining a temperature control time period ($\Delta t$) during which the temperature control arrangement (14) is intended to be powered by the energy storage source (30); —determining an ambient environment parameter (EP) indicative of the environment ambient of the vehicle (10) during the temperature control time period ($\Delta t$); —determining a state of charge (SOC) of the energy storage source (30) on or before a starting time of the temperature control time period ($\Delta t$) and—determining the limit value (TLV) as
(Continued)

the interior temperature input that can be used throughout the temperature control time period (Δt) on the basis of at least the temperature control time period (Δt), the ambient environment parameter (EP) and the state of charge (SOC).

19 Claims, 7 Drawing Sheets

(52) U.S. Cl.
CPC ... *B60H 1/00964* (2013.01); *B60W 2510/244* (2013.01); *B60W 2555/20* (2020.02); *B60W 2710/305* (2013.01)

(56) References Cited

U.S. PATENT DOCUMENTS

| | | | | |
|---|---|---|---|---|
| 2005/0285445 | A1* | 12/2005 | Wruck | H02J 9/002 307/10.1 |
| 2006/0139007 | A1* | 6/2006 | Kim | G01R 31/36 320/134 |
| 2007/0299560 | A1* | 12/2007 | LaHue | B60H 1/00964 700/276 |
| 2008/0014852 | A1* | 1/2008 | Mielke | B60H 1/00642 454/75 |
| 2008/0110189 | A1* | 5/2008 | Alston | H01M 10/482 62/236 |
| 2010/0132388 | A1* | 6/2010 | Oyobe | B60H 1/00657 62/157 |
| 2014/0277869 | A1* | 9/2014 | King | B60L 58/26 701/22 |
| 2019/0263222 | A1* | 8/2019 | Pihl | B60H 1/00378 |

FOREIGN PATENT DOCUMENTS

| | | |
|---|---|---|
| DE | 102014213075 A1 | 1/2016 |
| EP | 1391338 A1 | 2/2004 |
| EP | 1479546 A1 | 11/2004 |
| WO | 2010029120 A1 | 3/2010 |
| WO | 2011031933 A1 | 3/2011 |
| WO | 2014035298 A1 | 3/2014 |

OTHER PUBLICATIONS

International Preliminary Report on Patentability dated Oct. 10, 2018 in International Application No. PCT/EP2016/075530.

* cited by examiner

METHOD FOR ESTIMATING A LIMIT VALUE

TECHNICAL FIELD

The invention relates to a method for estimating a limit value for an interior temperature input for a passenger compartment of a vehicle. Moreover, the present invention relates to a method for determining an interior temperature input for a passenger compartment of a vehicle. Further, the present invention relates to a method for controlling an interior temperature of a passenger compartment of a vehicle. Additionally, the present invention relates to each one of a computer program, a computer readable medium, a control unit and a vehicle.

The invention can be applied in heavy-duty vehicles, such as trucks, buses and construction equipment, as well as in other types of vehicles, such as cars or boats. Although the invention will be described with respect to a truck, the invention is not restricted to this particular vehicle, but may also be used in other vehicles, such as buses and/or construction equipment, for instance working machines.

BACKGROUND

A vehicle may be furnished with a temperature control arrangement for controlling the interior temperature of the passenger compartment of the vehicle. For instance, the temperature control arrangement may be adapted to maintain the interior temperature within a comfortable temperature range even when the temperature ambient of the vehicle is not within the comfortable temperature range.

Generally, the temperature control arrangement may be powered, directly or indirectly, by a driveline of the vehicle such that a portion of the power produced by the driveline is used for powering the temperature control arrangement. Thus, at least a portion of the energy produced by one or more energy sources for powering the vehicle's driveline is consumed by the temperature control arrangement.

However, many types of vehicles, such as for instance trucks, may have a passenger compartment that may be used for accommodation. For instance, the compartment of a vehicle may be adapted to allow a driver to rest therein when the vehicle is stationary, for example between two legs of a transport assignment. Purely by way of example, the driver may sleep in the vehicle.

During the time at which the driver rests in a stationary vehicle, the driver may want to experience a comfortable passenger compartment interior temperature. As such, depending on the ambient temperature, the temperature control arrangement may be operated so as to cool or heat the passenger compartment.

However, when the vehicle is stationary and the driver rests therein, the complete drive line of the vehicle is generally not operating. In particular, in the event that the drive line comprises an internal combustion engine, such an engine is generally not operating during the rest period. Instead, during a rest period, the temperature control arrangement is generally powered by an energy storage source, e.g. a battery, having a state of charge.

Throughout the rest period, the state of charge of the energy storage source is reduced due to the energy consumption of the temperature control arrangement. Depending on the extension of the rest period and e.g. the environment ambient of the vehicle, there is a risk that the state of charge of the energy storage source reaches an undesirably low value during the rest period. For instance, there is a risk that the state of charge may be so low that the energy storage source as such is damaged and/or so low that the energy storage source cannot be used for starting, e.g. by cranking, the total drive line.

As such, it would be desirable to control the temperature control arrangement in such a manner that the state of charge of the energy storage source is kept within a desired state of charge range.

SUMMARY

An object of the invention is to provide a method enabling an appropriate control of a temperature control arrangement.

The object is achieved by a method according to claim 1.

A such, the present invention relates to a method for estimating a limit value for an interior temperature input of a passenger compartment of a vehicle. The vehicle comprises an energy storage source and a temperature control arrangement adapted to control the interior temperature of the passenger compartment of the vehicle on the basis of the interior temperature input. The temperature control arrangement is adapted to be powered by the energy storage source during at least one operating condition of the vehicle.

The method comprises:
determining a temperature control time period during which the temperature control arrangement is intended to be powered by the energy storage source;
determining an ambient environment parameter indicative of the environment ambient of the vehicle during the temperature control time period;
determining a state of charge of the energy storage source at or before a starting time of the temperature control time period and
determining the limit value as the interior temperature input that can be used throughout the temperature control time period on the basis of at least the temperature control time period, the ambient environment parameter and the state of charge.

The above method implies that a limit value for an interior temperature input may be determined taking at least the temperature control time period, the ambient environment parameter and the state of charge into account. This in turn implies that a limit value may be determined which does not result in that the state of charge of the energy storage source falls below an undesirably low level during the above-mentioned temperature control time period.

Optionally, the step of determining the ambient environment parameter comprises determining a vehicle ambient temperature at or before the starting time of the temperature control time period. The vehicle ambient temperature is generally straightforward to determine in a cost efficient manner, e.g. using one or more temperature sensors.

Optionally, the step of determining the ambient environment parameter comprises predicting a vehicle ambient temperature profile during the temperature control time period. The prediction of a vehicle ambient temperature profile during the temperature control time period implies that the limit value may be determined taking any ambient temperature changes that are predicted to occur during the temperature control time period into account, this in turn implying a possibility to determine the limit value with an appropriately high level of accuracy.

Optionally, the step of determining the ambient environment parameter comprises predicting a vehicle ambient air pressure profile throughout the temperature control time period. A vehicle ambient air pressure profile may have an effect of the power consumption of the temperature control arrangement. As such, taking a vehicle ambient air pressure profile into account implies an appropriately high level of accuracy for the determination of the limit value.

Optionally, the step of determining the ambient environment parameter comprises predicting a weather profile throughout the temperature control time period, the weather profile comprising at least one of the following characteristics: cloudiness, wind speed and humidity. Any one of the above characteristics may influence the power consumption of the temperature control arrangement. For instance, high wind speeds and/or a high humidity may increase the power consumption of the temperature control arrangement. As such, taking a weather profile into account may be beneficial in order to arrive at an appropriate limit value.

Optionally, the temperature control time period is at least 0.5 hours, preferably at least 2 hours, more preferred at least 4 hours, alternatively at least 8 hours. Any one of the above minimum ranges may be representative for a temperature control time period during which an operator, such as a driver, of the vehicle may (need to) require an appropriate interior temperature of the passenger compartment of a vehicle. Purely by way of example, a lunch stop may be within the range of 45 to 60 minutes and a night stop may have a duration of at least 8 hours.

Optionally, the energy storage source is associated with a minimum state of charge and the feature of determining the limit value comprises determining a difference between the determined state of charge and the minimum state of charge. The above features imply that a limit value be determined such that the energy storage source may have a minimum state of charge at the end of the temperature control time period. Purely by way of example, the minimum state of charge may be determined in order to ensure that the energy storage source is not damaged during the temperature control time period. In addition, or instead of, ensuring that the energy storage source is not damaged, the minimum state of charge may be set as the minimum state of charge required for starting the driveline of the vehicle.

Optionally, the limit value is a minimum value. Using the limit value as a minimum value for the interior temperature input of a passenger compartment of a vehicle may be useful when the temperature control arrangement is predicted to cool the passenger compartment of a vehicle during the temperature control time period.

Optionally, the temperature control arrangement is intended to be powered solely and/or exclusively by the energy storage source during the temperature control time period. The possibility to be powered solely and/or exclusively by the energy storage source may be useful for increasing the accuracy of the estimation of the limit value.

Optionally, the energy storage source is an electric energy storage source, preferably the energy storage source is a battery. An electric energy storage source is generally a cost-efficient implementation of an energy storage source.

A second aspect of the present invention relates to a method for determining an interior temperature input of a passenger compartment of a vehicle.

The method comprises:
receiving a temperature operator input indicative of a desired temperature;
receiving a time period operator input indicative of a desired time period during which the interior temperature input should be controlled in accordance with the temperature operator input, and
estimating a limit value for the interior temperature input using the method according the first aspect of the present invention, using the time period operator input for determining the temperature control time period.

By virtue of the above features, it is possible to determine an interior temperature input of a passenger compartment taking operator input, as well as the previously presented limit value, into account.

Optionally, the method further comprises presenting the limit value and/or the interior temperature input to the operator. The presentation of the any one of the above values may give an operator relevant information as regards e.g. what temperature to expect during the temperature control time range and/or what temperature is possible to obtain without reaching an undesirably low state of charge. Such information may encourage the operator to vary parameters, such as the temperature control time range.

Optionally, the method further comprises determining which one of the temperature operator input and the limit value that will result in a largest remaining state of charge of the energy storage source at the end of the desired temperature control time period. Such a determination implies a possibility to determine how suitable each one of the temperature operator input and the limit value is in terms of energy consumption of the energy storage source.

Optionally, the method further comprises setting the interior temperature input as the one of the temperature operator input and the limit value resulting in the largest remaining state of charge. The above feature implies that the interior temperature can be controlled such that a largest remaining state of charge is obtained at the end of the temperature control time period. For instance, if a temperature control arrangement for a certain time period is employed for cooling a passenger compartment of the vehicle and the temperature operator input is lower than the limit value, the limit value may set as the interior temperature input in order to avoid an undesirably low state of charge at the end of the time period. On the other hand, if a temperature control arrangement for a certain time period is employed for heating a passenger compartment of the vehicle and the temperature operator input is again lower than the limit value, the temperature operator input may set as the interior temperature input in order to avoid an undesirably low state of charge at the end of the time period.

Optionally, the method further comprises:
receiving an operator override input from the operator and setting the interior temperature input as the temperature operator input.

The above override capability implies that an operator is presented the option not to use the limit value but instead be able to exclusively set the interior temperature input.

Optionally, the method further comprises:
receiving an operator override time period input from the operator;
setting the interior temperature input as temperature operator input during an override time period defined by the override time period input, and
for the portion of the temperature control time period outside the override time period, setting the interior temperature input as the value of the temperature operator input and the limit value resulting in the largest remaining state of charge of the energy storage source at the end of the temperature control time period.

The above features imply that an operator may be presented with the option not to use the limit value for an override time period. During the override time period, the operator may instead exclusively set the interior temperature input. The above procedure may for instance be useful when an operator intends to sleep in the vehicle. Using the above features, the operator may choose to reduce the temperature in the vehicle for an override time period, e.g. two hours, during which the operator intends to fall asleep. Then, subsequent to the override time period when the operator is sleeping, the interior temperature input may be set with a focus of obtaining a desired state of charge at the end of the temperature control time period.

A third aspect of the present invention relates to a method for controlling an interior temperature of a passenger compartment of a vehicle. The vehicle comprises an energy storage source and a temperature control arrangement adapted to control the interior temperature of the passenger compartment of the vehicle on the basis of the interior temperature input. The temperature control arrangement is adapted to be powered by the energy storage source during at least one operating condition of the vehicle.

The method comprises:
determining an interior temperature input using a method according to the second aspect of the present invention and
issuing the interior temperature input to the temperature control arrangement.

The above method implies an appropriate interior temperature control which may result in an appropriate state of charge at the end of the temperature control time period.

A fourth aspect of the present invention relates to a computer program comprising program code means for performing the steps of any of the preceding aspects when the program is run on a computer.

A fifth aspect of the present invention relates to a computer readable medium carrying a computer program comprising program code means for performing the steps of any of the first, second or third aspects of the present invention when the program product is run on a computer.

A fifth aspect of the present invention relates to a control unit for controlling an interior temperature of a passenger compartment of a vehicle, the control unit being configured to perform the steps of the method according to any of any of the first, second or third aspects of the present invention.

A sixth aspect of the present invention relates to a vehicle comprising a control unit according to the fifth aspect of the present invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
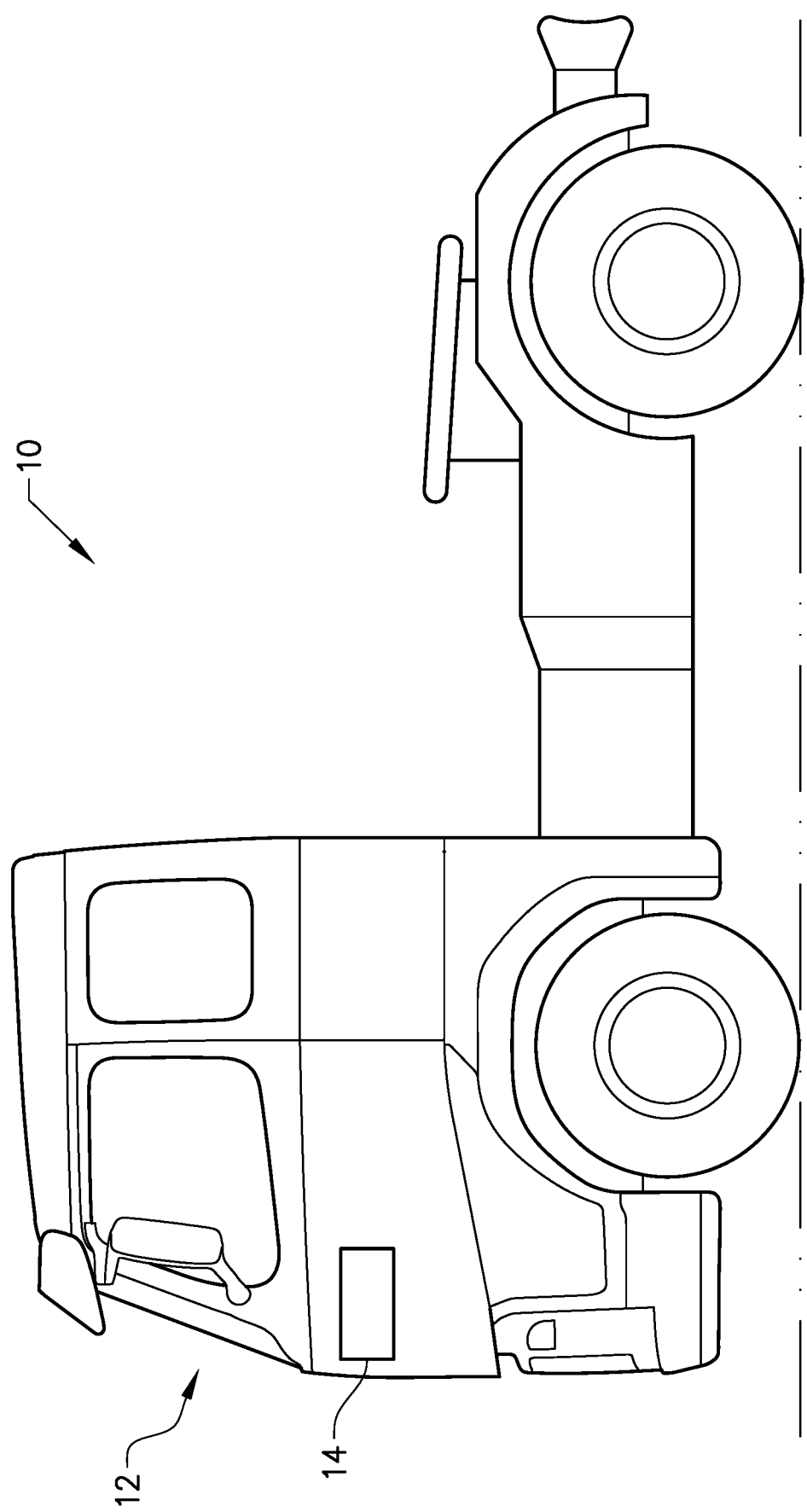
FIG. 1 illustrates a vehicle.

The invention will be described below for a vehicle in the form of a truck 10 such as the one illustrated in FIG. 1. The truck 10 should be seen as an example of a vehicle for which the method according to the present invention could be used or which could comprise a computer program, a computer readable medium and/or a control unit according to the present invention. However, the computer program, the computer readable medium and/or the control unit of the present invention may be implemented in a plurality of different types of vehicles. Purely by way of example, the computer program, the computer readable medium and/or the control unit could be implemented in a truck, a tractor, a car, a bus, a seagoing vessel such as a ship or a boat, a work machine such as a wheel loader or an articulated hauler, or any other type of construction equipment.

The vehicle 10 comprises a passenger compartment 12. The interior temperature of the passenger compartment 12 may be controlled by a temperature control arrangement 14.

Figure 2:
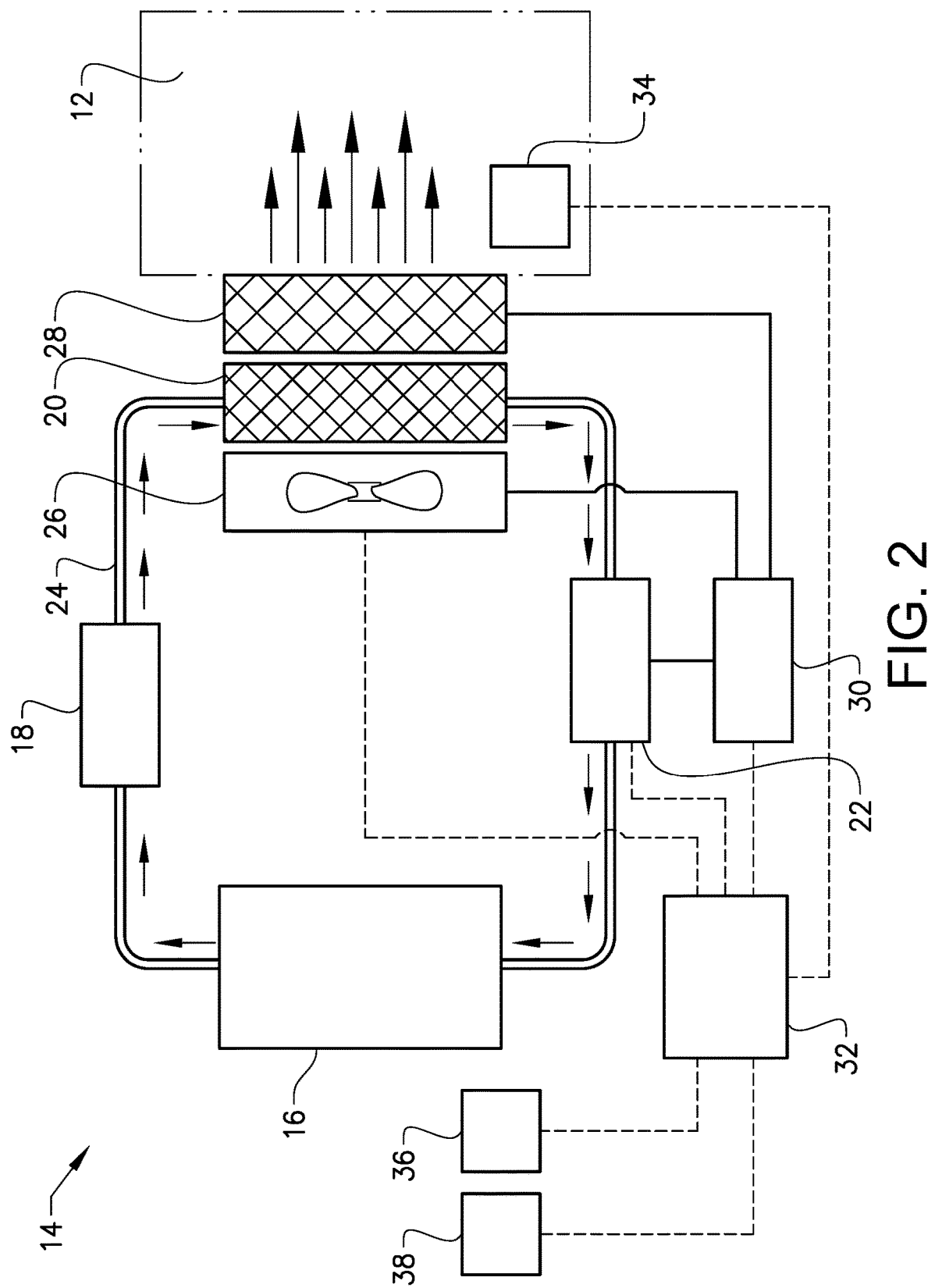
FIG. 2 illustrates a temperature control arrangement for a vehicle.

FIG. 2 discloses an embodiment of a temperature control arrangement 14. Generally, and as is indicated in the FIG. 2 embodiment, a temperature control arrangement 14 comprises the following components: a condenser 16, an expansion member 18, e.g. an expansion valve, an evaporator 20 and a compressor 22. The above components are fluidly connected to each other, for instance by means of a conduit assembly 24, such that a cooling medium may be transported from the condenser 16 to the evaporator 20 via the expansion member 20 and back to the condenser 16 via the compressor 22.

The temperature control arrangement 14 further comprises a fan 26 adapted to feed air into the passenger compartment 12 via the evaporator 20. Purely by way of example, the air may be air ambient of the vehicle and/or air recirculated from the passenger compartment 12. Moreover, the temperature control arrangement 14 may further comprise a heater 28 and the fan may also be adapted to feed air into the passenger compartment 12 via the heater 28. Purely by way of example, the heater 28 may comprise a heat exchanger (not shown) and/or a heat source (not shown).

The temperature control arrangement 14, for instance each one of the compressor 22, the fan 26 and the heater 28, may be powered by at least an energy storage source 30. Purely by way of example, the energy storage source 30 may be an electric energy storage source. Preferably the energy storage source is a battery.

Purely by way of example, the temperature control arrangement 14 may be intended to be powered solely and/or exclusively by the energy storage source 30 during at least certain operating conditions of the vehicle, for instance when the vehicle is intended to be stationary for a relatively long time. However, it is also envisaged that embodiments of the temperature control arrangement 14 may, at least during certain operating conditions, be adapted to be powered by one or more power sources instead of, or in addition to, the energy storage source 30. As a non-limiting example, embodiments of the temperature control arrangement 14 may be adapted to be powered by an internal combustion engine (not shown) during certain operating conditions of the vehicle.

The energy storage source 30 has a state of charge indicating its charging status.

Moreover, FIG. 2 illustrates a control unit 32. The control unit 32 is adapted to control the temperature control arrangement 14. In the FIG. 2 embodiment, the control unit 32 forms part of the temperature control arrangement 14 but it is also envisaged that the control unit 32 may be external to the temperature control arrangement 14.

The control unit 32 is adapted to control the interior temperature of the passenger compartment 12 on the basis of an interior temperature input. Purely by way of example, the control unit 32 may comprise a closed-loop control unit. Consequently, the control unit 32 may be in communication to a sensor 34, e.g. a temperature sensor 34, adapted to determine the temperature in the passenger compartment 12. In such an embodiment, the interior temperature input may be used as a temperature set point value and the passenger compartment temperature, detected by the sensor 34, may be used as a temperature actual value in a closed-loop temperature control procedure.

In order to be able to control the interior temperature of the passenger compartment 12, the control unit 32 is preferably in communication with at least one, preferably each one, of the compressor 22, the fan 26 and the heater 28.

Moreover, the control unit 32 may be in communication with operator input means 36. The operator input means 36 is adapted to allow an operator to send instructions to the control unit 32. Purely by way of example, the operator input means 36 may comprise at least one of the following components: a lever, a knob, one or more keys and a touch screen (not shown). The operator input means 36 may be adapted to communicate with the control unit 32 via one or more cables. As another alternative, the operator input means 36 may be adapted to communicate with the control unit 32 in a wireless manner. Furthermore, the operator input means 36 may for instance comprise a graphical user interface, such as an app, which an operator may use for inputting date and possibly also sending instructions to the control unit 32.

As a non-limiting example, the operator input means 36 may be located in the passenger compartment 12. Furthermore, as another non-limiting example, the operator input means 36 may comprise a mobile unit, e.g. a cellular telephone, which may be adapted to communicate with the control unit 32 even when the operator input means 36 is located outside the passenger compartment 12.

Furthermore, the control unit 32 may be in communication with an ambient environment determination assembly 38. The ambient environment determination assembly 38 may comprise at least one means adapted to determine a condition of the environment external to the vehicle. Purely by way of example, the ambient environment determination assembly 38 may comprise one or more sensors adapted to determine a condition ambient of the vehicle. Other non-limiting implementations of the ambient environment determination assembly 38 may, instead, or in addition, comprise communication means for communication, e.g. wireless communication, with information sources (not shown), such as a server, external to the vehicle.

Figure 3:
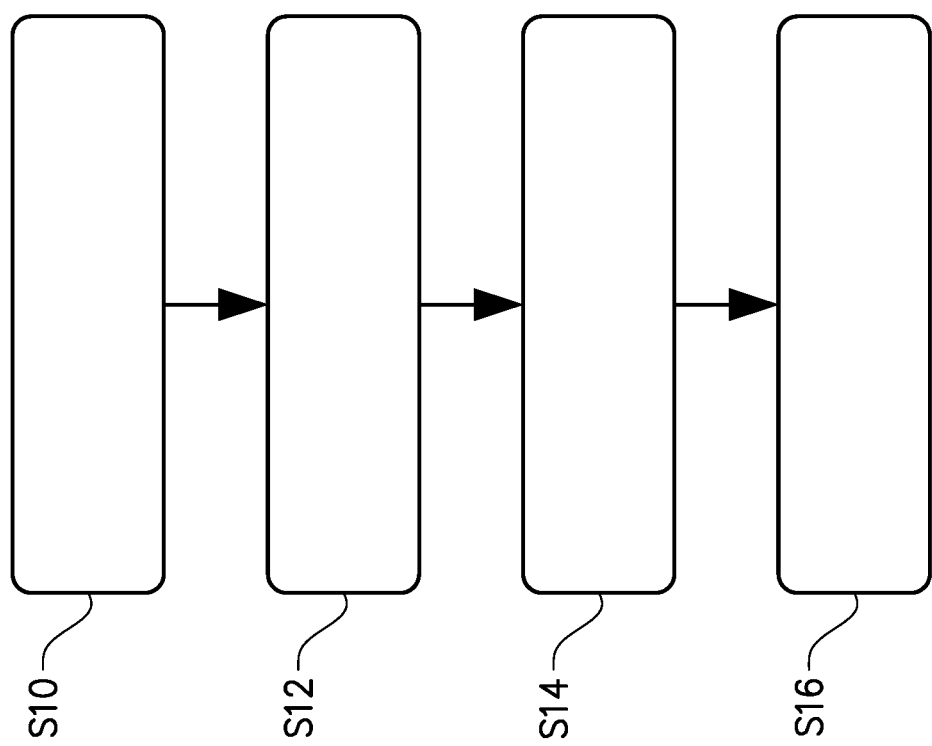
FIG. 3 is a flow chart of an embodiment of a method according to the present invention.

With reference to FIG. 3, an aspect of the present invention proposes a method for estimating a limit value $T_{LV}$ for the interior temperature input of the passenger compartment 12 of the vehicle 10. Purely be way of example, the FIG. 3 method may be performed by the control unit 32. The method comprises:

S10: Determining a temperature control time period Δt during which the temperature control arrangement 14 is intended to be powered by the energy storage source 30. Purely by way of example, the temperature control time period Δt may be input by the operator via the operator input means 36.

S12: Determining an ambient environment parameter EP indicative of the environment ambient of the vehicle 10 during the temperature control time period Δt. As a non-limiting example, such a determination may be performed using the ambient environment determination assembly 38.

S14: Determining a state of charge SOC of the energy storage source 30 on or before a starting time of the temperature control time period Δt. Purely by way of example, the state of charge SOC of the energy storage source 30 may be determined by the energy storage source 30 itself, e.g. using a state of charge sensor (not shown) forming part of the energy storage source 30 and which is in communication with the control unit 32. As another non-limiting example, the state of charge SOC may be determined from historical data, e.g. based on energy fed by the energy storage source 30 since a previously known state of charge SOC.

S16: determining the limit value $T_{LV}$ as the interior temperature input that can be used throughout the temperature control time period Δt on the basis of at least the temperature control time period Δt, the ambient environment parameter EP and the state of charge SOC.

As regards the above step S12, the step of determining the ambient environment parameter may for instance comprise determining a vehicle ambient temperature at or before the starting time of the temperature control time period Δt. In such an event, the ambient environment determination assembly 38 may comprise a temperature sensor located external to the vehicle for determining the ambient temperature.

Instead of, or in addition to, determining a vehicle ambient temperature, step S12 may comprise predicting a vehicle ambient temperature profile during the temperature control time period Δt. To this end, reference is made to FIG. 4 illustrating an example of an ambient temperature profile 40 from a start time $t_0$ to an end time $t_1$ of a temperature control time period Δt during which the temperature control arrangement 14 is intended to be powered by the energy storage source 30.

Figure 4:
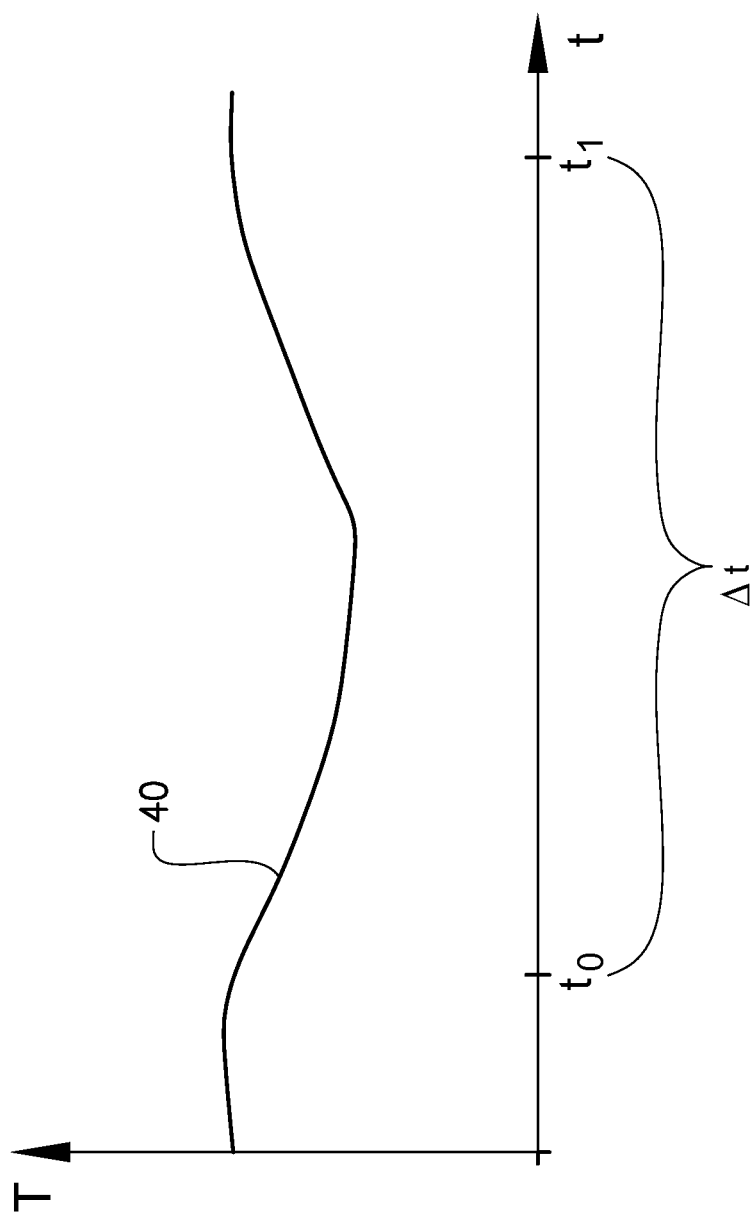
FIG. 4 is a graph illustrating an example of a method.

The FIG. 4 ambient temperature profile 40 may for instance be indicative of a temperature profile during a temperature control time period Δt including night hours during which the vehicle ambient temperature generally is lower as compared to daytime temperatures. Purely by way of example, the ambient temperature profile 40 may be determined by arranging the ambient environment determination assembly 38 to be in contact with a weather forecast service, for instance by means of a wireless communication. Optionally, the ambient temperature profile 40 may be determined based on historical data. Purely by way of example, a vehicle ambient temperature profile during the temperature control time period Δt may be predicted using previously stored temperature profiles.

As may be gleaned from FIG. 4, taking an ambient temperature profile 40 into account when estimating the limit value $T_{LV}$ implies the possibility to estimate a more accurate limit value. For instance, in the event that the ambient temperature generally is higher than a desired temperature in the passenger compartment, thus requiring cooling of the passenger compartment, the use of the ambient temperature profile 40 may allow a limit value $T_{LV}$ that is lower than the limit value that would be obtained if a single ambient temperature, e.g. the instant ambient temperature at the start time $t_0$, were to be used instead. As another example, in the event that the ambient temperature generally is lower than a desired temperature in the passenger compartment, thus requiring heating of the passenger compartment, the ambient temperature profile 40 may require a limit value $T_{LV}$ that is lower than the limit value that would be obtained if a single ambient temperature, e.g. the instant ambient temperature at the start time $t_0$, were to be used instead.

The step S12 of determining the ambient environment parameter EP may also or instead comprise predicting a vehicle ambient air pressure profile throughout the temperature control time period $\Delta t$. An ambient air pressure profile may for instance be determined by arranging the ambient environment determination assembly 38 to be in contact with a weather forecast service, for instance by means of a wireless communication.

The step S12 of determining the ambient environment parameter EP may also or instead comprise predicting other types of parameters indicative of the weather ambient of the vehicle. Purely by way of examples, the step S12 of determining the ambient environment parameter EP may comprise predicting a weather profile throughout the temperature control time period $\Delta t$, wherein the weather profile comprises at least one of the following characteristics: cloudiness, wind speed and humidity. Again, the above weather profile may be determined by arranging the ambient environment determination assembly 38 to be in contact with a weather forecast service, for instance by means of a wireless communication.

As regards the temperature control time period $\Delta t$, examples thereof may be that the temperature control time period $\Delta t$ is at least 0.5 hours, preferably at least 2 hours, more preferred at least 4 hours, alternatively at least 8 hours. Any one of the above minimum time periods may give a driver ample time to rest in the passenger compartment.

As a non-limiting example, the energy storage source 30 may be associated with a minimum state of charge $SOC_{min}$ and the feature of determining the limit value comprises determining a difference between the determined state of charge and the minimum state of charge. The value of the minimum state of charge may depend on the type of the energy storage source. Purely by way of non-limiting examples, for a lead battery, the minimum state of charge may be approximately 50% of the maximum possible state of charge, whereas for an AGM or Gel battery, the minimum state of charge may be approximately 15-20% of the of the maximum possible state of charge. It should further be noted that other energy storage sources are also or instead envisaged to be used for powering the temperature control arrangement 14. As further non-limiting examples, an energy storage source may comprise a fuel cell and/or another type of battery, such as a Li-Ion battery.

Depending on whether the temperature control arrangement is envisioned to be used for cooling or for heating the passenger compartment 12 during the temperature control time period $\Delta t$, the limit value $T_{LV}$ may be a minimum value or a maximum value. For instance, when the temperature control arrangement is envisioned to be used for cooling the passenger compartment 12 during the temperature control time period $\Delta t$, the limit value $T_{LV}$ may be a minimum value.

As a non-limiting example, the temperature control arrangement may be intended to be powered solely and/or exclusively by the energy storage source during the temperature control time period. However, it is also envisaged that embodiments of the above method may take into account that the energy storage source powers one or more vehicle auxiliaries, such as communication arrangements or the like, in addition to powering the temperature control arrangement. Instead of, or in addition to the possibility to take the energy consumption of the above vehicle auxiliaries into account, embodiments of the above method may take into account that the additional power sources powers the temperature control arrangement, directly or indirectly, during the temperature control time period $\Delta t$. For instance, the vehicle may be equipped with one or more solar panels (not shown) which may be adapted to charge the energy storage source and the embodiments of the above method may take such a charging into account when determining the limit value $T_{LV}$. As another non-limiting example, if it is detected that the energy storage source is charged by, or in any other way connected to, an external power source, embodiments of the method may take the powering capacity of such an external power source into account when determining the limit value $T_{LV}$. As an example, if the external power source is connected to the energy storage source such that the state of charge of the energy storage source is not reduced to any substantive extent throughout the temperature control time period $\Delta t$, this will result in a limit value $T_{Lv}$ that will generally not actually limit the interior temperature control. In fact, in such an event, the limit value $T_{Lv}$ can in practice be disregarded and the interior temperature control may be performed with a focus on maximum comfort in accordance with the operator's comfort preferences.

The above-mentioned limit value $T_{LV}$ may be used for a plurality of purposes. As a first example, the limit value $T_{LV}$ may be used in a method for determining an interior temperature input of a passenger compartment of a vehicle.

Figure 5:
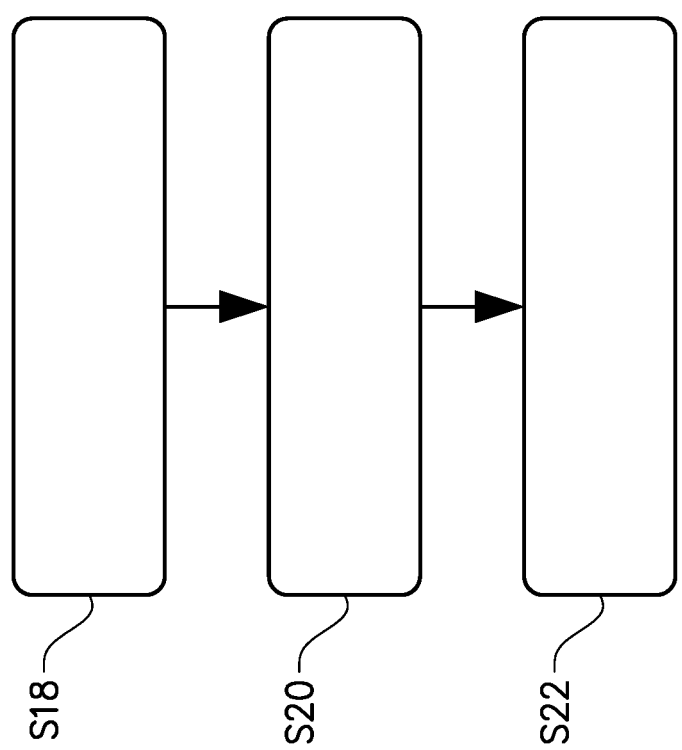
FIG. 5 is a flow chart of an embodiment of a method according to the present invention.

With reference to FIG. 5, such a method comprises:

S18: receiving a temperature operator input $T_{OI}$ indicative of a desired temperature. Purely by way of example, an operator may enter the temperature operator input $T_{OI}$ into a control unit, such as the FIG. 2 control unit 32, using an operator input means, such as the FIG. 2 operator input means 36.

S20: receiving a time period operator input indicative of a desired time period during which the interior temperature input should be controlled in accordance with the temperature operator input. In a similar vein as for the temperature operator input, though again purely by way of example, an operator may enter the time period operator input into a control unit, such as the FIG. 2 control unit 32, using an operator input means, such as the FIG. 2 operator input means 36.

S22: estimating a limit value for the interior temperature input, for instance using any one of the above discussed method embodiments, using the time period operator input for determining the temperature control time period $\Delta t$. Purely by way of example, the temperature control time period $\Delta t$ may be set to equal the time period operator input. However, it is also envisaged that the temperature control time period $\Delta t$ may be determined as a function, e.g. a linear or non-linear function, of the time period operator input.

The limit value estimate in S22 hereinabove may be used in a plurality of ways when determining an interior temperature input of a passenger compartment of a vehicle.

For instance, embodiments of the above method may comprise determining which one of the temperature operator input $T_{OI}$ and the limit value $T_{LV}$ that will result in a largest remaining state of charge SOC of the energy storage source 30 at the end of the temperature control time period $\Delta t$.

Put differently, the method may comprise determining which one of the temperature operator input $T_{OI}$ and the limit value $T_{LV}$ that will result in the smallest energy consumption of the energy storage source during the temperature control time period.

Figure 6:
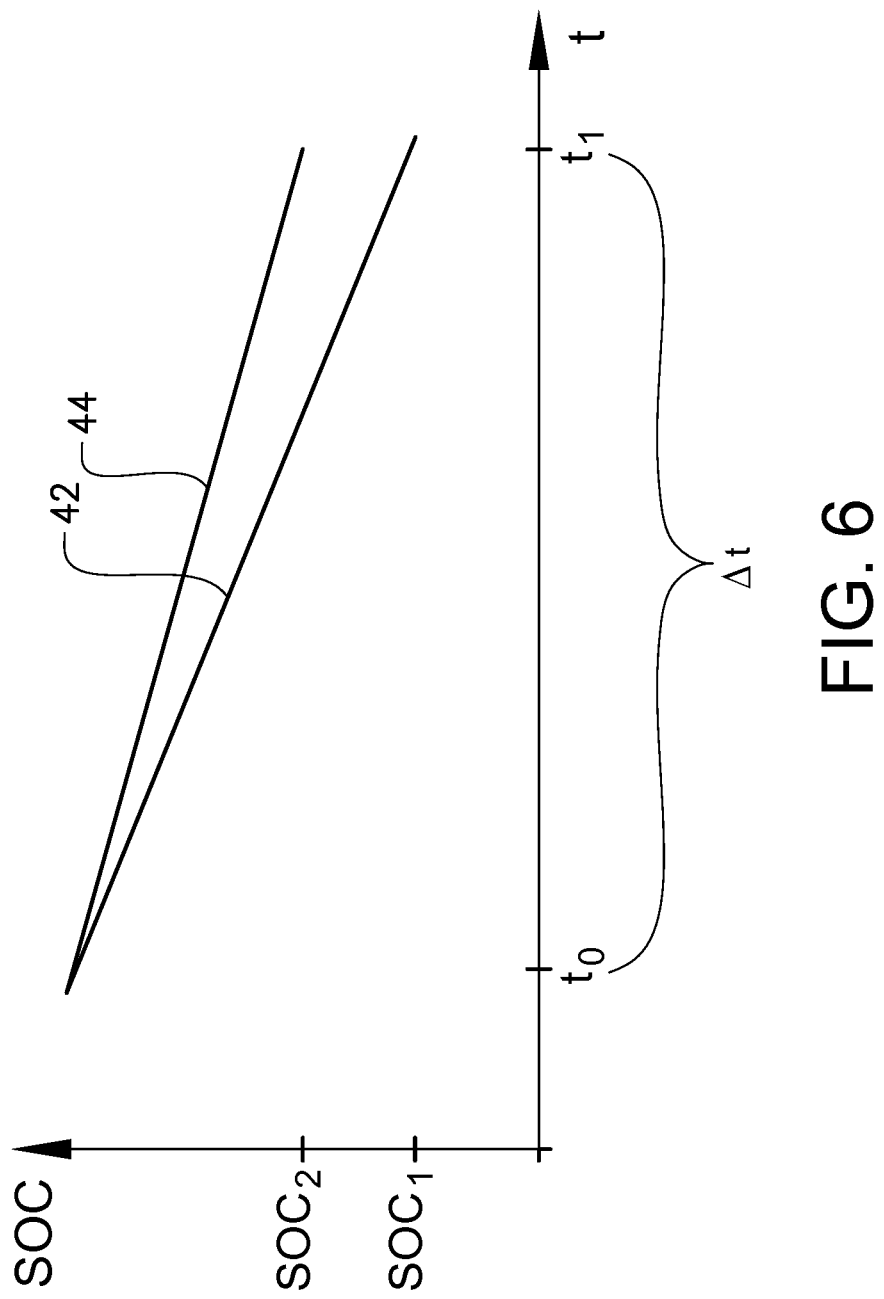
FIG. 6 is a graph illustrating an example of a method.

An example of the above method embodiment is illustrated in FIG. 6. FIG. 6 illustrates the expected reduction of the state of charge of the energy storage source throughout the temperature control time period Δt. In particular, line 42 indicates the expected reduction of the state of charge of the energy storage source 30 when the temperature operator input $T_{OI}$ is used as the interior temperature input, whereas line 44 indicates the expected reduction of the state of charge of the energy storage source when the limit value $T_{LV}$ is used as the interior temperature input.

Moreover, as may be gleaned from FIG. 6, using the temperature operator input $T_{OI}$ as the interior temperature input is expected to result in a first state of charge $SOC_1$ of the energy storage source 30 at the end of the temperature control time period Δt whereas the use of the limit value $T_{LV}$ as the interior temperature input is expected to result in a second state of charge $SOC_2$. The second state of charge $SOC_2$ generally corresponds to a minimum state of charge $SOC_{min}$ for the relevant energy storage source 30. In the example illustrated in FIG. 6, the second state of charge $SOC_2$ is greater than the first state of charge $SOC_1$.

Further, the method further may comprise setting the interior temperature input as the one of the temperature operator input $T_{OI}$ and the limit value $T_{LV}$ resulting in the largest remaining state of charge. In the FIG. 6 example, the interior temperature input would consequently be set to the limit value $T_{LV}$ since the second state of charge $SOC_2$ is greater than the first state of charge $SOC_1$.

Moreover, the method may further comprise presenting the limit value $T_{LV}$ and/or the interior temperature input to the operator. Such a presentation may for instance be carried out using a presentation means (not shown) such as a display of the vehicle, for instance a display of the operator input means 36.

The method may also comprise receiving an operator override input from the operator and setting the interior temperature input as temperature operator input. As such, the operator is presented with an option to, at least for a certain time period, disregard the interior temperature input determined by the above method. Since such an override may result in that the state of charge of the energy storage source reaches an undesirably low value, the above operator override temperature may be associated with an operator override time period.

As such, though purely by way of example, the method may comprise
- receiving an operator override time period input from the operator;
- setting the interior temperature input as the temperature operator input $T_{OI}$ during an override time period $Δt_{OO}$ defined by the override time period input, and
- for the portion of the temperature control time period Δt outside the override time period $Δt_{OO}$, setting the interior temperature input as the value of the temperature operator input $T_{OI}$ and the limit value $T_{LV}$ resulting in the largest remaining state of charge SOC of the energy storage source 30 at the end of the temperature control time period Δt.

Purely by way of example, the override time period may be approximately 2 hours.

Figure 7:
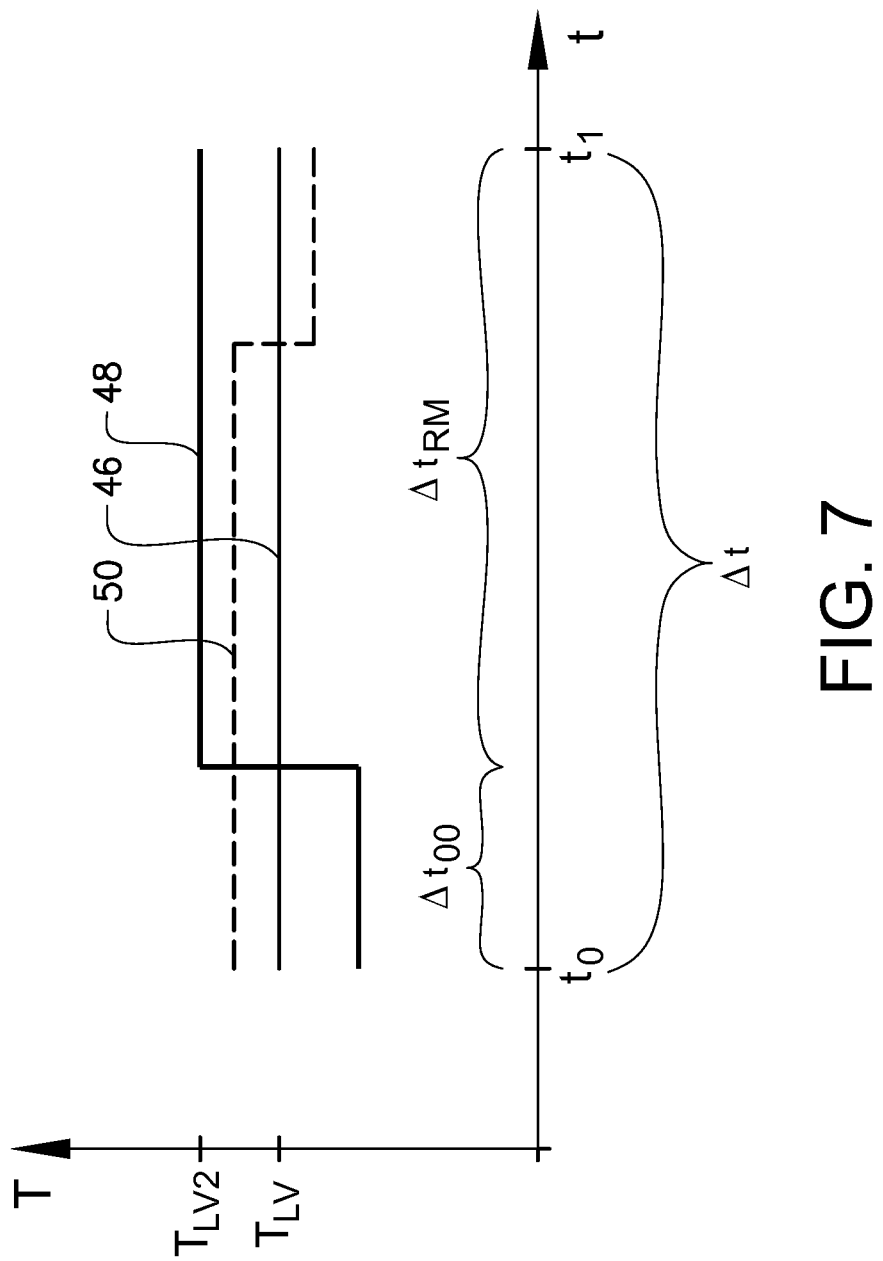
FIG. 7 is a graph illustrating an example of a method.

An example of the above method embodiment is exemplified in FIG. 7, in which example the passenger compartment needs to be cooled during the temperature control time period Δt. Moreover, line 46 in FIG. 7 illustrates the interior temperature input being set by the limit value $T_{LV}$. Thus, using the limit value $T_{LV}$, a constant interior temperature input is used throughout the temperature control time period Δt.

Further, FIG. 7 illustrates a line 48 which corresponds to an interior temperature input determined using an embodiment of the above override method. As may be gleaned from FIG. 7, the interior temperature input illustrated by line 48 is for an override time period $Δt_{OO}$ defined by the temperature operator input $T_{OI}$. In this case, the temperature operator input $T_{OI}$ is lower than the limit value $T_{LV}$. As such, during the override time period $Δt_{OO}$, the state of charge of the energy storage source is reduced to a greater extent than what would occur, should the limit value $T_{LV}$ be used instead.

As such, for the portion of the temperature control time period Δt outside the override time period $Δt_{OO}$, a second limit value $T_{LV2}$ is determined for the remaining portion $Δt_{RM}$ of the temperature control time period Δt, using the state of charge of the energy storage source after the override time period $Δt_{OO}$.

Purely by way of example, the second limit value $T_{LV2}$ may be presented to the operator. Such a presentation would give the operator the possibility to evaluate whether or not the selected parameters for the override time period $Δt_{OO}$ temperature operator input $T_{OI}$ result in an acceptable second limit value $T_{LV2}$ outside the override time period $Δt_{OO}$.

FIG. 7 illustrates that the override time period $Δt_{OO}$ occurs at the beginning of the temperature control time period Δt. However, it is also envisioned that the override time period $Δt_{OO}$ may constitute another portion of the temperature control time period Δt. Such a scenario is exemplified by the dotted line 50 in FIG. 7, for which the override time period $Δt_{OO}$ occurs at the end of the temperature control time period Δt. In such an embodiment, the method may comprise a step of estimating the future energy consumption during the override time period $Δt_{OO}$ in order to determine an appropriate limit value $T_{LV}$ prior to the override time period $Δt_{OO}$. It is also envisaged that the override time period $Δt_{OO}$ may be an intermediate time period, i.e. with time period end points located within the temperature control time period Δt.

The interior temperature input determined using any one of the above methods may be used for controlling an interior temperature of a passenger compartment 12 of a vehicle 10. The vehicle 10 comprises an energy storage source 30 and a temperature control arrangement 14 adapted to control the interior temperature of the passenger compartment 12 of the vehicle 10 on the basis of the interior temperature input. The temperature control arrangement is adapted to be powered by the energy storage source 30 during at least one operating condition of the vehicle. The interior temperature input thus determined is issued to the temperature control arrangement.

Purely by way of example, the above method may comprise issuing a warning signal, e.g. an audible, visual and/or haptic warning signal, in the event that the state of charge of the energy storage source 30 is equal to or below a predetermined minimum value. Such a warning signal may be used for drawing the operator's attention to the fact that the certain measures need to be taken in order to avoid arriving at an undesirably low state of charge. A non-limiting example of such measures is starting an internal combustion engine of the vehicle.

Further, although the above example embodiments propose that the limit value $T_{LV}$ is determined only once for a temperature control time period Δt, it is also envisioned that embodiments of any one of the above methods may determine, and possibly also use, limit values $T_{LV}$ throughout a predetermined temperature control time period Δt. Purely be way of example, the limit value $T_{LV}$ may be updated on a regular or non-regular basis throughout the predetermined temperature control time period Δt.

Moreover, the present invention relates to a computer program comprising program code means for performing the steps of any of the above methods when the program is run on a computer. Additionally, the present invention relates to a computer readable medium carrying a computer program comprising program code means for performing the steps of any of the above methods when the program product is run on a computer.

Furthermore, the present invention relates to a control unit 32 for controlling an interior temperature of a passenger compartment 12 of a vehicle 10, the control unit being configured to perform any one of the above the method steps. Further, the present invention relates to a vehicle comprising a control unit according to the fifth aspect of the present invention.

It is to be understood that the present invention is not limited to the embodiments described above and illustrated in the drawings; rather, the skilled person will recognize that many changes and modifications may be made within the scope of the appended claims.

The invention claimed is:

1. A method for determining an interior temperature input of a passenger compartment (12) of a vehicle (10), said method comprising:
receiving a temperature operator input ($T_{OI}$) indicative of a desired temperature;
receiving a time period operator input indicative of a desired time period during which said interior temperature input should be controlled in accordance with said temperature operator input, and
estimating a limit value ($T_{LV}$) for said interior temperature input using a method for estimating the limit value ($T_{LV}$) for the interior temperature input of said passenger compartment (12) of said vehicle (10), said vehicle (10) comprising an energy storage source (30) and a temperature control arrangement (14) adapted to control the interior temperature of said passenger compartment (12) of said vehicle (10) on the basis of said interior temperature input, said temperature control arrangement (14) being adapted to be powered by said energy storage source (30) during at least one operating condition of said vehicle (10), said method for estimating said limit value ($T_{LV}$) comprising:
using said time period operator input for determining a temperature control time period ($\Delta t$) during which said temperature control arrangement (14) is intended to be powered by said energy storage source (30);
determining an ambient environment parameter (EP) indicative of the environment ambient of said vehicle (10) during said temperature control time period ($\Delta t$);
determining a state of charge (SOC) of said energy storage source (30) at or before a starting time of said temperature control time period ($\Delta t$) and
determining said limit value ($T_{LV}$) as the interior temperature input that can be used throughout said temperature control time period ($\Delta t$) on the basis of at least said temperature control time period ($\Delta t$), said ambient environment parameter (EP) and said state of charge (SOC),
characterized in that said method further comprises:
determining which one of the temperature operator input ($T_{OI}$) and the limit value ($T_{LV}$) that will result in a largest, of the temperature operator input ($T_{OI}$) and the limit value ($T_{LV}$), remaining state of charge (SOC) of said energy storage source (30) at the end of said temperature control time period ($\Delta t$).

2. The method according to claim 1, wherein said step of determining said ambient environment parameter (EP) comprises determining a vehicle (10) ambient temperature on or before said starting time of said temperature control time period ($\Delta t$).

3. The method according to claim 1, wherein said step of determining said ambient environment parameter (EP) comprises predicting a vehicle ambient temperature profile during said temperature control time period ($\Delta t$).

4. The method according to claim 1, wherein said step of determining said ambient environment parameter (EP) comprises predicting a vehicle ambient air pressure profile throughout said temperature control time period ($\Delta t$).

5. The method according to claim 1, wherein said step of determining said ambient environment parameter (EP) comprises predicting a weather profile throughout said temperature control time period ($\Delta t$), said weather profile comprising at least one of the following characteristics: cloudiness, wind speed and humidity.

6. The method according to claim 1, wherein said temperature control time period ($\Delta t$) is at least 0.5 hours.

7. The method according to claim 1, wherein said energy storage source (30) is associated with a minimum state of charge ($SOC_{min}$) and the feature of determining said limit value ($T_{LV}$) comprises determining a difference between the state of charge (SOC) and said minimum state of charge ($SOC_{min}$).

8. The method according to claim 1, wherein said limit value ($T_{LV}$) is a minimum value.

9. The method according to claim 1, wherein said temperature control arrangement (14) is intended to be powered solely and/or exclusively by said energy storage source (30) during said temperature control time period ($\Delta t$).

10. The method according to claim 1, wherein said energy storage source (30) is an electric energy storage source, preferably said energy storage source is a battery.

11. The method according to claim 1, wherein said method further comprises:
presenting said limit value ($T_{LV}$) and/or said interior temperature input to said operator.

12. The method according to claim 1, wherein said method further comprises:
setting the interior temperature input as the one of said temperature operator input ($T_{OI}$) and said limit value ($T_{LV}$) resulting in said largest, of the temperature operator input ($T_{OI}$) and the limit value ($T_{LV}$), remaining state of charge (SOC).

13. The method according to claim 1, wherein said method further comprises:
receiving an operator override input from the operator and setting the interior temperature input as said temperature operator input ($T_{OI}$).

14. The method according to claim 13, wherein said method further comprises:
receiving an operator override time period input from the operator;
setting the interior temperature input as temperature operator input ($T_{OI}$) during an override time period ($\Delta t_{OO}$) defined by said override time period input, and
for the portion of the temperature control time period ($\Delta t$) outside the override time period ($\Delta_{OO}$), setting the interior temperature input as the value of the temperature operator input ($T_{OI}$) and the limit value ($T_{LV}$) resulting in the largest remaining state of charge (SOC)

of said energy storage source (30) at the end of said temperature control time period (Δt).

15. A method for controlling an interior temperature of a passenger compartment (12) of a vehicle (10), said vehicle (10) comprising an energy storage source (30) and a temperature control arrangement (14) adapted to control the interior temperature of said passenger compartment (12) of said vehicle (10) on the basis of an interior temperature input, said temperature control arrangement (14) being adapted to be powered by said energy storage source (30) during at least one operating condition of said vehicle (10), said method comprising:
- determining said interior temperature input using the method according to claim 1 and
- issuing said interior temperature input to said temperature control arrangement (14).

16. A computer program comprising program code for performing the method of claim 1 when said program is run on a computer.

17. A computer readable medium carrying a computer program comprising program code for performing the method of claim 1 when said computer readable medium is run on a computer.

18. A control unit (32) for controlling an interior temperature of a passenger compartment (12) of a vehicle (10), the control unit being configured to perform the method of claim 1.

19. A vehicle (10) comprising the control unit according to claim 18.

* * * * *